US009556608B2

(12) United States Patent
Smith

(10) Patent No.: US 9,556,608 B2
(45) Date of Patent: Jan. 31, 2017

(54) ROOF ERECTION SYSTEM AND ASSEMBLY KIT

(71) Applicant: Dale Smith, Keewatin, CA (US)

(72) Inventor: Dale Smith, Keewatin, CA (US)

( * ) Notice: Subject to any disclaimer, the term of this patent is extended or adjusted under 35 U.S.C. 154(b) by 0 days.

(21) Appl. No.: 14/822,194

(22) Filed: Aug. 10, 2015

(65) Prior Publication Data

US 2016/0047116 A1 Feb. 18, 2016

Related U.S. Application Data

(60) Provisional application No. 62/036,387, filed on Aug. 12, 2014.

(51) Int. Cl.
| | | |
|---|---|---|
| *E04C 3/02* | (2006.01) | |
| *E04B 1/41* | (2006.01) | |
| *E04B 7/02* | (2006.01) | |
| *E04G 21/18* | (2006.01) | |
| *G01C 9/00* | (2006.01) | |
| *E04B 1/38* | (2006.01) | |

(52) U.S. Cl.
CPC ............. *E04B 1/40* (2013.01); *E04B 7/022* (2013.01); *E04G 21/1891* (2013.01); *G01C 9/00* (2013.01); *E04B 2001/405* (2013.01)

(58) Field of Classification Search
CPC .......... E04G 21/1891; E04C 3/02; E04C 3/04; E04C 3/07; E04C 2003/026; E04B 2001/1924; E04B 7/045; E04B 1/2612; E04B 1/2608; E04B 2001/2415; E04B 2001/2644; E04B 7/06
See application file for complete search history.

(56) References Cited

U.S. PATENT DOCUMENTS

| | | | | |
|---|---|---|---|---|
| 2,963,127 A | * | 12/1960 | Manville | E04B 2/56 248/188.91 |
| 3,000,145 A | | 7/1961 | Fine | |
| 3,077,009 A | * | 2/1963 | Hutchinson | E04C 3/02 52/632 |
| 3,201,874 A | * | 8/1965 | Christy | E04C 3/02 269/43 |
| 3,333,875 A | | 8/1967 | Tracy | |
| 3,849,961 A | | 11/1974 | Gwynne | |
| 4,245,809 A | * | 1/1981 | Jackson | E04B 1/1903 249/15 |

(Continued)

OTHER PUBLICATIONS

Frook Pty Ltd, http://www.frook.biz/, Copyright 2004-2006 (2 pages).

(Continued)

*Primary Examiner* — Brian Mattei
*Assistant Examiner* — Gisele Ford
(74) *Attorney, Agent, or Firm* — Kagan Binder, PLLC

(57) ABSTRACT

Described herein is a truss/rafter roof erection system and kit that include H brackets that attach to a drop gable and are set to desired height. The first bracket attaches to a gable bracket piece and when the next truss is put in place a first and a second bar member are then slid into place, is pinned and fastened with a security cable. A security cable wraps around the truss or rafter and is secured into place with a one-way locking apparatus. At the finish (or other end of the roof) of the roof on the drop gable, or rafter, a second H bracket is fastened in the same manner as the starter end and is connected to a bar member.

7 Claims, 8 Drawing Sheets

(56) References Cited

U.S. PATENT DOCUMENTS

| | | | |
|---|---|---|---|
| 4,435,932 A | 3/1984 | Seaburg et al. | |
| 5,056,750 A * | 10/1991 | Ellithorpe | E04B 1/2612 248/354.3 |
| 5,148,642 A | 9/1992 | Plumier et al. | |
| 5,303,520 A * | 4/1994 | Gozdziak | E04B 7/04 403/59 |
| 5,580,036 A * | 12/1996 | Browning | E04G 21/1891 269/37 |
| 5,622,022 A | 4/1997 | Haisch | |
| 5,628,119 A * | 5/1997 | Bingham | E04G 21/1891 269/904 |
| 5,642,569 A * | 7/1997 | Palmer | G01B 3/08 33/809 |
| 5,884,448 A | 3/1999 | Pellock | |
| 5,937,608 A * | 8/1999 | Kucirka | E04B 5/12 52/105 |
| 6,000,191 A | 12/1999 | Kessler | |
| 6,244,010 B1 | 6/2001 | Sluiter | |
| 6,481,676 B1 * | 11/2002 | Bluestone | F16B 7/14 248/217.2 |
| 6,658,753 B2 * | 12/2003 | Tatarnic | G01C 15/02 33/613 |
| 6,672,014 B1 | 1/2004 | Jones | |
| 7,152,338 B2 | 12/2006 | Thompson et al. | |
| 7,275,731 B1 * | 10/2007 | Shinault | E04G 25/06 248/354.5 |
| 7,571,551 B1 * | 8/2009 | Anderson | E04G 21/1841 33/613 |
| 7,891,144 B2 | 2/2011 | Gilstrap et al. | |
| 7,918,054 B2 | 4/2011 | Grafton et al. | |
| 8,061,088 B2 | 11/2011 | Walker | |
| 2002/0170189 A1 * | 11/2002 | Cheatham | E04F 21/0015 33/194 |
| 2004/0211076 A1 * | 10/2004 | Vicario | G01B 3/04 33/613 |
| 2004/0255544 A1 * | 12/2004 | Bradley | E02D 29/0283 52/831 |
| 2005/0210678 A1 * | 9/2005 | Thurston | B25B 5/006 29/897.31 |
| 2006/0010703 A1 * | 1/2006 | Gauthier | E04G 21/1891 33/613 |
| 2006/0260219 A1 * | 11/2006 | Riddle | E04G 21/1891 52/127.2 |
| 2007/0012847 A1 * | 1/2007 | Tai | E04B 9/006 248/343 |
| 2007/0044418 A1 * | 3/2007 | Koetter | E04B 7/022 52/695 |
| 2007/0044419 A1 * | 3/2007 | Koetter | E04B 7/022 52/696 |
| 2007/0056222 A1 * | 3/2007 | Buchanan | E04C 3/02 52/72 |
| 2007/0089374 A1 * | 4/2007 | Vasta | E04C 3/005 52/204.2 |
| 2007/0119067 A1 * | 5/2007 | Mackey | G01B 3/20 33/613 |
| 2007/0215773 A1 * | 9/2007 | Kerr | E04B 9/006 248/343 |
| 2009/0100694 A1 * | 4/2009 | Hooks | E04G 21/1891 33/645 |
| 2009/0139183 A1 | 6/2009 | Brizendine | |
| 2010/0043310 A1 | 2/2010 | Platts | |
| 2010/0083519 A1 * | 4/2010 | Bradley | E04G 21/1841 33/613 |
| 2011/0088274 A1 * | 4/2011 | Lonergan | E04B 9/006 33/613 |
| 2011/0219724 A1 * | 9/2011 | Davis | E04G 21/1891 52/745.09 |
| 2011/0289878 A1 * | 12/2011 | Morey | E04D 13/0315 52/653.2 |
| 2012/0180422 A1 * | 7/2012 | Noturno | E04G 21/1891 52/696 |
| 2012/0324802 A1 | 12/2012 | Gianolio | |
| 2013/0067839 A1 * | 3/2013 | Zimmerman | E04B 1/26 52/293.3 |
| 2013/0067851 A1 | 3/2013 | Zimmerman et al. | |
| 2014/0311082 A1 * | 10/2014 | Sidhu | F16B 9/00 52/693 |

OTHER PUBLICATIONS

Mfg. Super Anchor Safety, Safety Bar and Truss Bar Instruction/Specification Manual 08 version, Copyright 2008 (2 pages).

* cited by examiner

ROOF ERECTION SYSTEM AND ASSEMBLY KIT

PRIORITY CLAIM

The present nonprovisional patent application claims the benefit of and priority to, under 35 USC §119(e), U.S. Provisional Patent Application No. 62/036,387, filed Aug. 12, 2014, entitled "SSS ROOF SYSTEM," the entirety of which is incorporated herein by reference.

FIELD OF THE INVENTION

The invention relates generally to a truss and rafter roof erection system and related assembly kit and components.

BACKGROUND

Currently there are a number of solutions for erecting a new truss/rafter roof with interconnecting pieces. Some of these solutions attempt to use traditional methods, which utilize temporary bracing consisting of lumber, but these solutions fail to meet the needs of the market because the lumber is most often discarded and wasted. Other solutions attempt to use a crane to lift trusses, but these solutions are similarly unable to meet the needs of the market because the time spent using the crane is often wasted while using the bracing method due to time needed to properly secure, measure, and level trusses. The use of a crane is also a poor solution for bracing trusses, as cranes are costly, so the more time the crane is in use the more expensive the project becomes.

One option that has been proposed for bracing trusses originates from Australia called the Frook system (http://www.frook.biz/). Although the The Frook attempts to provide a truss bracing option, it fails to address the need to level the gable truss and fails to provide users proper safety as user are left without a tie off option to connect a safety harness worn by the roofer. Since, The Frook system is intended to be temporary and removable, if a severe storm occurs during roof erection The Frook system can easily come apart as it is assembled with hooks, loops and vice-terminations. Finally, once construction of the residential roof truss portion is complete and The Frook apparatus is designed to be removed, however the roof truss structure remains unstable until the roof is completed and even then the completed roof is not as sturdy or robust as it could be. Therefore, there is a need for a roof truss and rafter erection system that is easy to use and provides additional stability to the erected roof structure.

SUMMARY OF THE INVENTION

It would be advantageous to have a system, as described herein, designed for anyone who builds residential homes to assist with erecting a new truss or rafter roof. The assembly includes interconnecting pieces throughout the length of the roof that tie together as one secure unit. Furthermore, it would also be advantageous to have an apparatus, as described herein, which is designed to make erecting of trusses and rafters a safer and faster method of roof construction. Still further, it would be advantageous to have an apparatus that has interchangeable pieces so if one becomes damaged it can be replaced without having to purchase an entire new system. Also, the apparatus or assembly has the ability to use multiple systems combined to create a larger system. Therefore, there currently exists a need in the market for a system that is a safer, faster, and environmentally friendly product.

The invention advantageously fills the aforementioned deficiencies by providing a truss/rafter roof erection system that is designed to make erecting of trusses and rafters a safer, faster method of roof construction. The system is designed to erect a new truss or rafter roof with interconnecting pieces throughout the length of the roof by tying the components together as one secure unit. The invention is a system or assembly designed for builders of residential homes to assist with erecting a new truss or rafter roof with interconnecting pieces throughout the length of the roof by tying them together as one secure unit. Multiple systems can be combined to create a larger system.

The assembly has interchangeable pieces so if one becomes damaged it can be replaced. An optional power bar attachment and compressor attachment can easily be added for convenience and a connecting H bracket can be utilized in multiple drop gable sizes. The assembly has a built-in tape measure or scale on both sides of each member, which allows for left to right or right to left erection. The tape measure or scale allows for hands free rafter or truss layout of any spacing requirements.

Among other things, it is an advantage of the invention to provide a truss or rafter roof erection system that does not suffer from any of the problems or deficiencies associated with prior solutions. It is still further an advantage of the invention to have power and compressor attachments to allow for time saving and safer use of power tools during roof construction.

In one example embodiment, a roof erection system for stabilizing roof trusses is provided that includes an H bracket configured from two side plates that are substantially parallel to each other having a top end and a bottom end, the side plates being connected via a span or center member that is perpendicular to the side plates and is located distal to the bottom end of the side plates so as to form a bottom U-shaped end and a top U-shaped end of the H bracket, the bottom U-shaped end configured to be secured to a first truss member; and a bar assembly having at least a first bar and a second bar, the first bar engaged at one end with the top end U-shaped of the H bracket and engage at the other end with the second bar in a collinear arrangement, wherein the second bar engages a second truss member; and a security pin assembly locking the first and second bars together in the collinear arrangement. In this example embodiment, the erection system includes a second H bracket having a bottom U-shaped end configured to engage a third truss member, wherein a free end of the bar assembly is engaged with a top U-shaped end of the second H bracket. In this example embodiment, each bar of the bar assembly is selected from the group consisting of an electrical or power bar, an air or compression bar and a spanning bar.

In a related embodiment, the erection system further includes a security cable having a first end and a second end and a middle portion, the first end of the security cable engaging the first bar with the middle portion being wrapped around the second truss member and the second end of the cable engaging the second bar. In this example embodiment, the bar assembly includes a plurality of bars connected in a collinear relationship and interposed between the first and second bars.

In another example embodiment, a roof erection assembly kit comprising: a first and a second bracket each configured from two side plates that are substantially parallel to each other and being connected via a span or center member that is perpendicular to the side plates, the center member being located distal to a bottom end of the side plates so as to form a bottom U-shaped end, the bottom U-shaped end adapted to be secured to a first truss member; and a bar assembly having at least a first bar and a second bar, the first bar engaged at a top end of the bracket and engaged at the other end with the second bar in a collinear arrangement, wherein the second bar is adapted to engage a second truss member. In addition, a security pin assembly is included that is adapted to lock the first and second bars together in the collinear arrangement, wherein the second bar is adapted to be secured to a second truss member. In a related example embodiment, the assembly kit further includes a security cable having a first end and a second end and a middle portion, the first end of the security cable adapted to engage the first bar with the middle portion adapted to be wrapped around the second truss member, the second end of the cable adapted to engage the second bar. In another related example embodiment, the assembly kit includes at least one leveling device disposed between the side plates of at least one of the brackets to provide a self-leveling capability.

In a related example embodiment, the bar assembly includes a plurality of bars connected in a collinear relationship and interposed between the first and second bars, wherein each bar of the bar assembly is selected from the group consisting of an electrical or power bar, an air or compression bar and a spanning bar.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various example embodiments of the invention are directed to a truss or rafter roof erection system and assembly kit. In one example embodiment, the invention is a system designed to erect trusses and rafters in a safer and faster manner and without the use of large industrial construction equipment. An H-type bracket attaches to a drop gable set to desired height (for example, 2×4, 2×6, or 2×8). The first bar member, or starter, attaches to the gable H bracket piece. The next truss is put in place and a second bar member is slid into place (over an end portion of the first bar member), pinned or fastened and then further fastened with a separate security cable. The security cable wraps around truss or rafter and is secured into place with a one-way locking apparatus. All consecutive trusses and members are secured in the same manner. At the finish of the roof on the drop gable or rafter a second H bracket is fastened to the drop gable in the same manner as the starter end. In related embodiments, the brackets are attached to a top or bottom chord, depending on the type of construction.

This process ties the roof trusses or rafters together in one continuous assembly, thereby providing more overall strength and stability of the final roof structure. By tying the roof structure together in this manner there is little to no chance for movement or separation in each individual truss or rafter. In a related embodiment, a built-in tape measure or scale on both sides of each bar member allows for left to right or right to left erection. The tape measure or scale also allows for hands free rafter or truss layout. In addition, power and compressor bar member attachments allow for time saving and safer use of power tools during roof construction.

Figure 1:
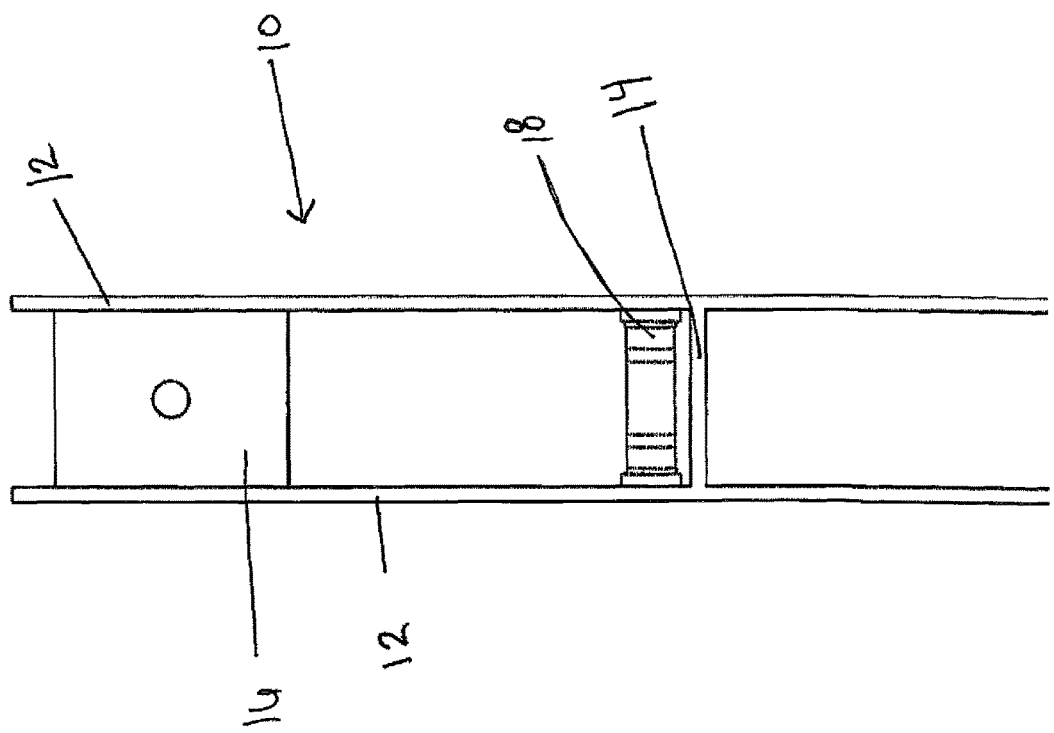
FIG. 1 illustrates a side view of an example embodiment of an H-bracket forming part of an example roof assembly system and kit according to the invention.
Figure 7:
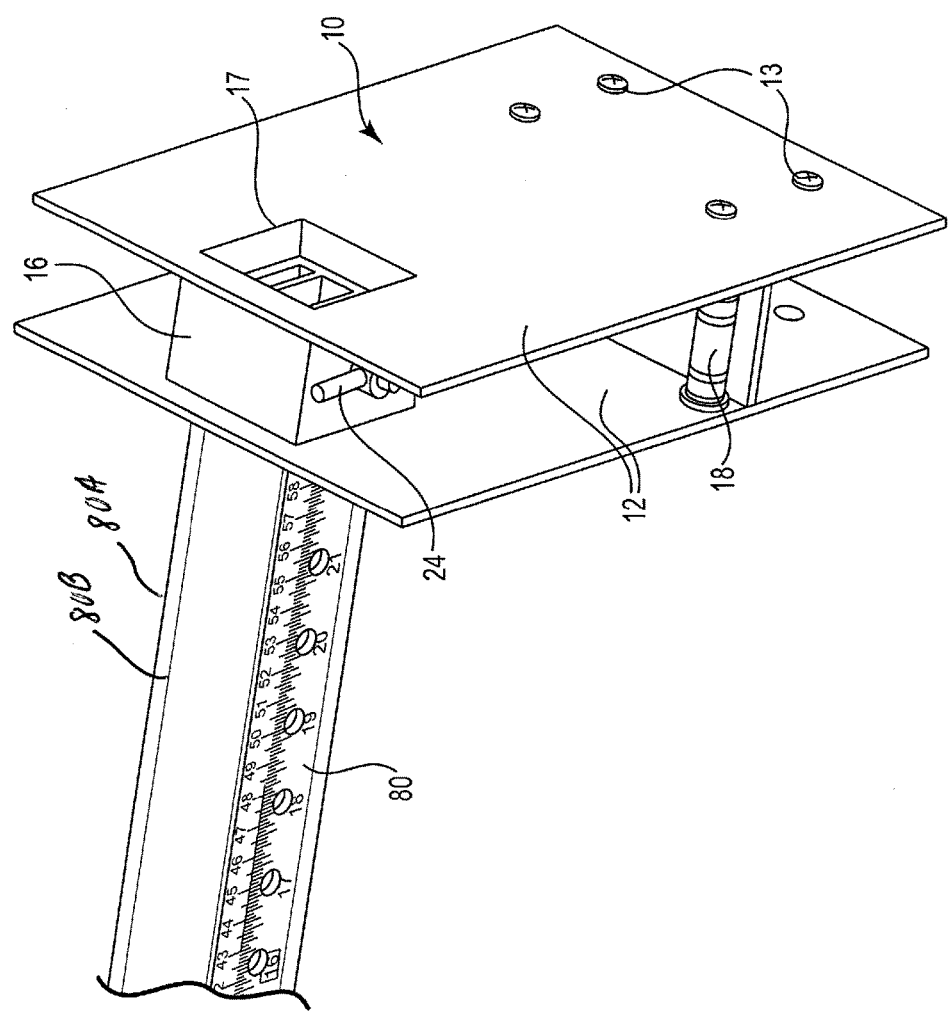
FIG. 7 illustrates a perspective view of an example embodiment of a bar connected to an H-bracket and connecting bar member forming one end of an example roof assembly system and kit according to the invention.

Referring to now to the figures, FIGS. 1 and 7 illustrate side and perspective views of an example embodiment of part of a roof erection assembly system and kit that includes an H-type bracket 10 configured from two side plates 12 connected by a span or center member 14 that is perpendicular to the two side plates. Side plates 12 include holes or slots 13 for nails or screws or bolts for attaching H bracket 10 to an end truss or a drop gable set. In this example embodiment, H bracket 10 includes an adjustment mechanism 16 and window 17 that allows other bar members 40, 60, 80 (FIGS. 3-5) to connect to H bracket 10 at varying heights, depending on the needs of the user. In a related embodiment, the brackets are formed with one bottom U-shaped end and a single plate protruding up from center member 14. In yet other related embodiments, the brackets are formed into other configurations that are attachable to the gable truss or other trusses or rafters and that provide an upper member that engages the starting bar member.

Figure 2:
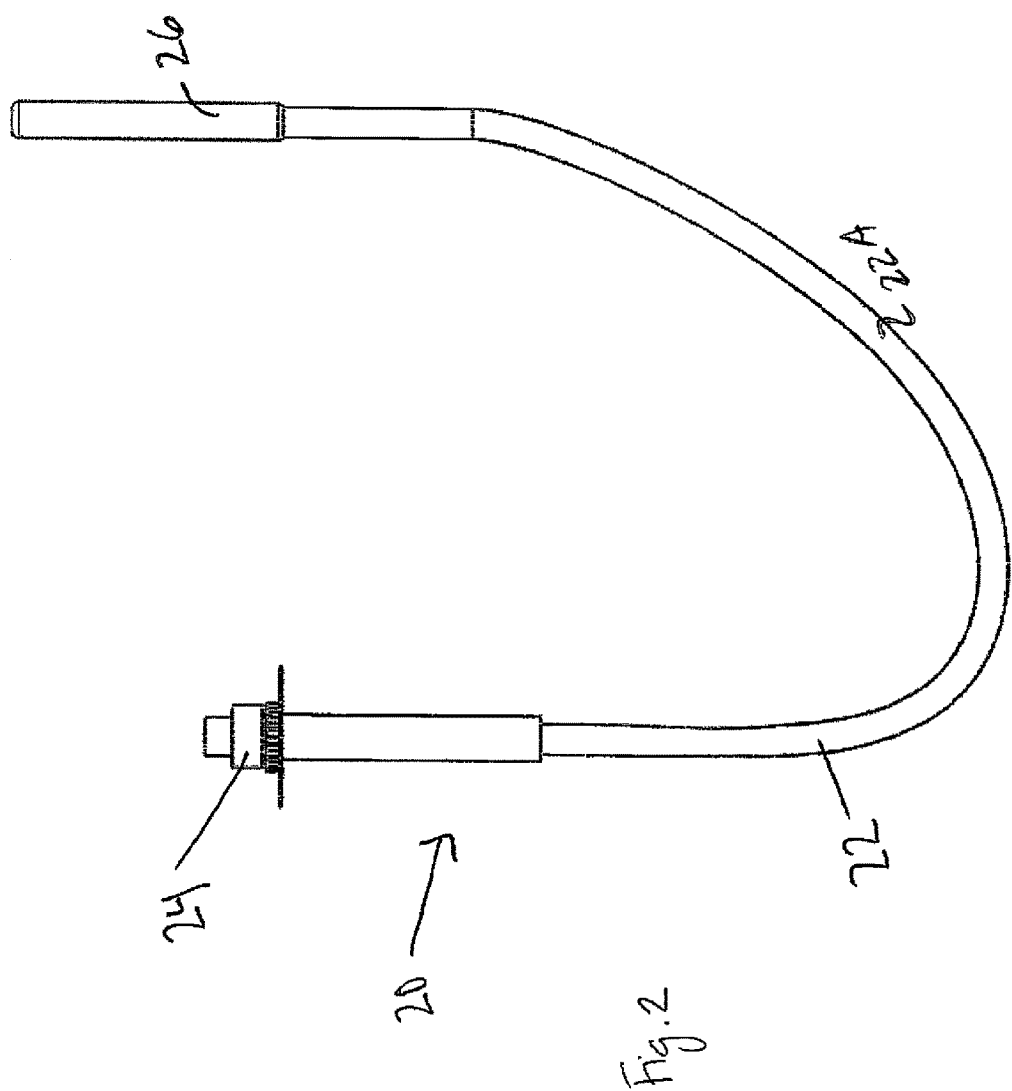
FIG. 2 illustrates an example embodiment of a locking cable pin assembly forming part of an example roof assembly system and kit according to the invention.
Figure 5:
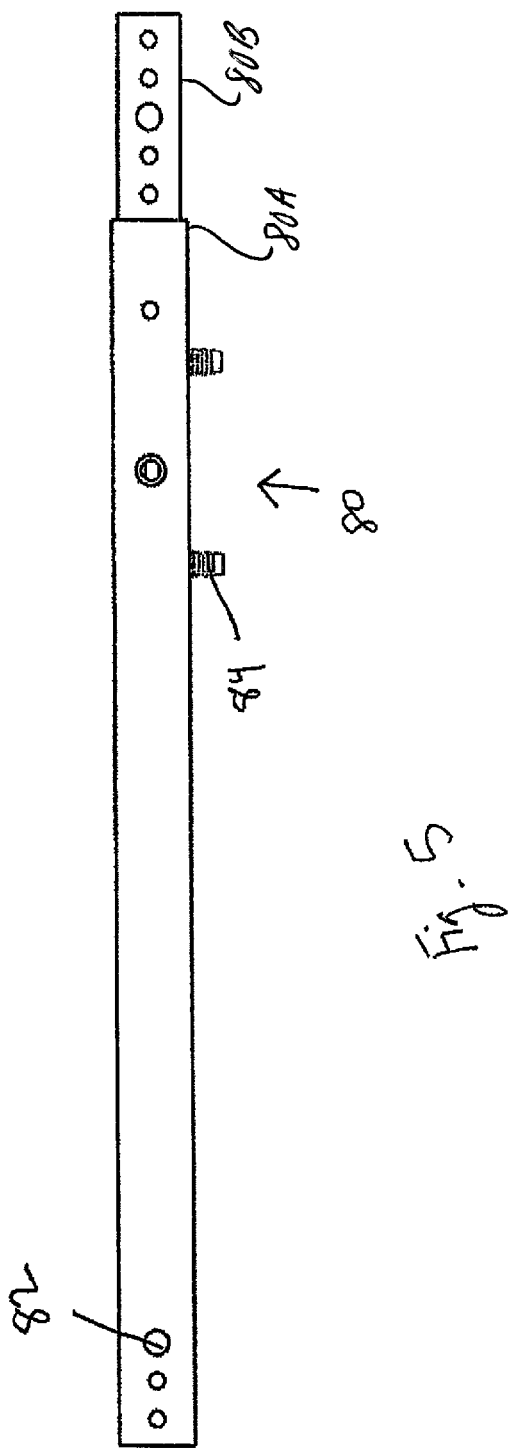
FIG. 5 illustrates an example embodiment of an compressor bar forming part of an example roof assembly system and kit according to the invention.
Figure 6:
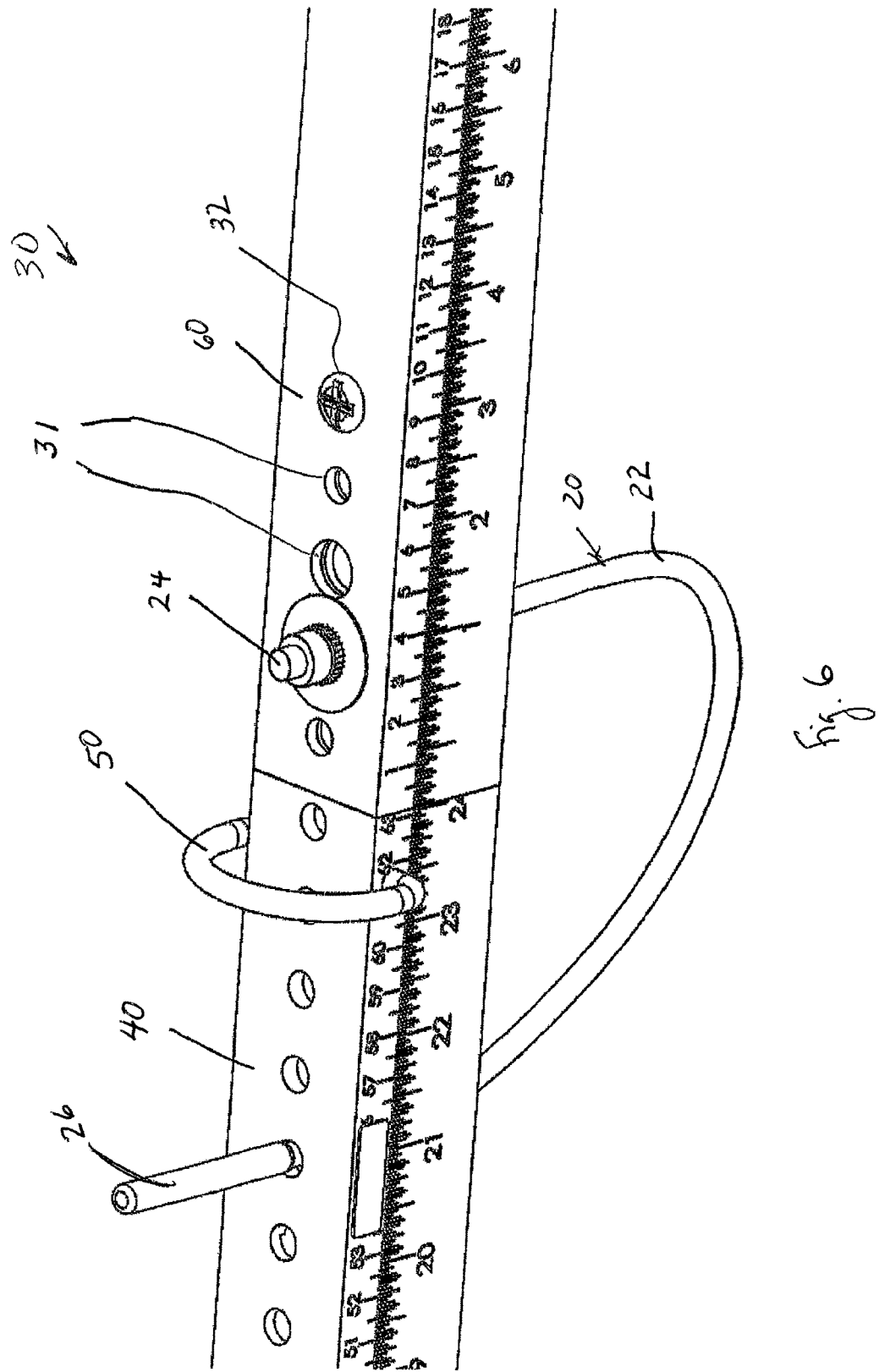
FIG. 6 illustrates an example embodiment of more than one bar member collinearly connected to each other with the locking cable pin assembly according to the invention

Referring now to FIGS. 2 and 6, there is illustrated an example embodiment of a locking cable pin assembly 20 and a bar member assembly 30, respectively, that is assembled according to the invention. In this example embodiment, bar members 40 and 60 (which have a plurality of holes 31) are joined and held together by fastener 32 and then further fastened with a locking cable pin assembly 20 that includes a security cable 22 attached thereto and a one-way locking member 24 at one end and a tapered cap 26 at the other end. One-way locking member 24 connects to and through any one of bar members 40, 60, 80 (FIGS. 3-5) to form bar assembly 30. FIG. 6 illustrates a middle bar 40 connected to a power bar 60 in addition to locking cable pin assembly 20 and also includes a security eye loop 50 (or security tie-off) to connect a safety harness worn by the roofer that is erecting the truss structure. Security cable 22 is configured to be of sufficient length to connect bars 40, 60, 80 without too much excess. Security cable 22 is also long enough to wrap a middle portion 22A around a truss or rafter and then feed tapered end 26 up through an opening in bar 40. This provide additional fastening stability to the bar members and to the truss. In alternative embodiments, any type of bar 40, 60, 80 may be attached to each other depending on the needs of the user and a double headed pin or nail with a locking pin is used to secure two bars together.

In the example embodiment using a pin or nail to hold bar members together a separate safety cable is used and wrapped around a truss to further secure the system in case of fastener malfunction and ensure the system does not fall in case a worker falls while erecting the system.

Figure 3:
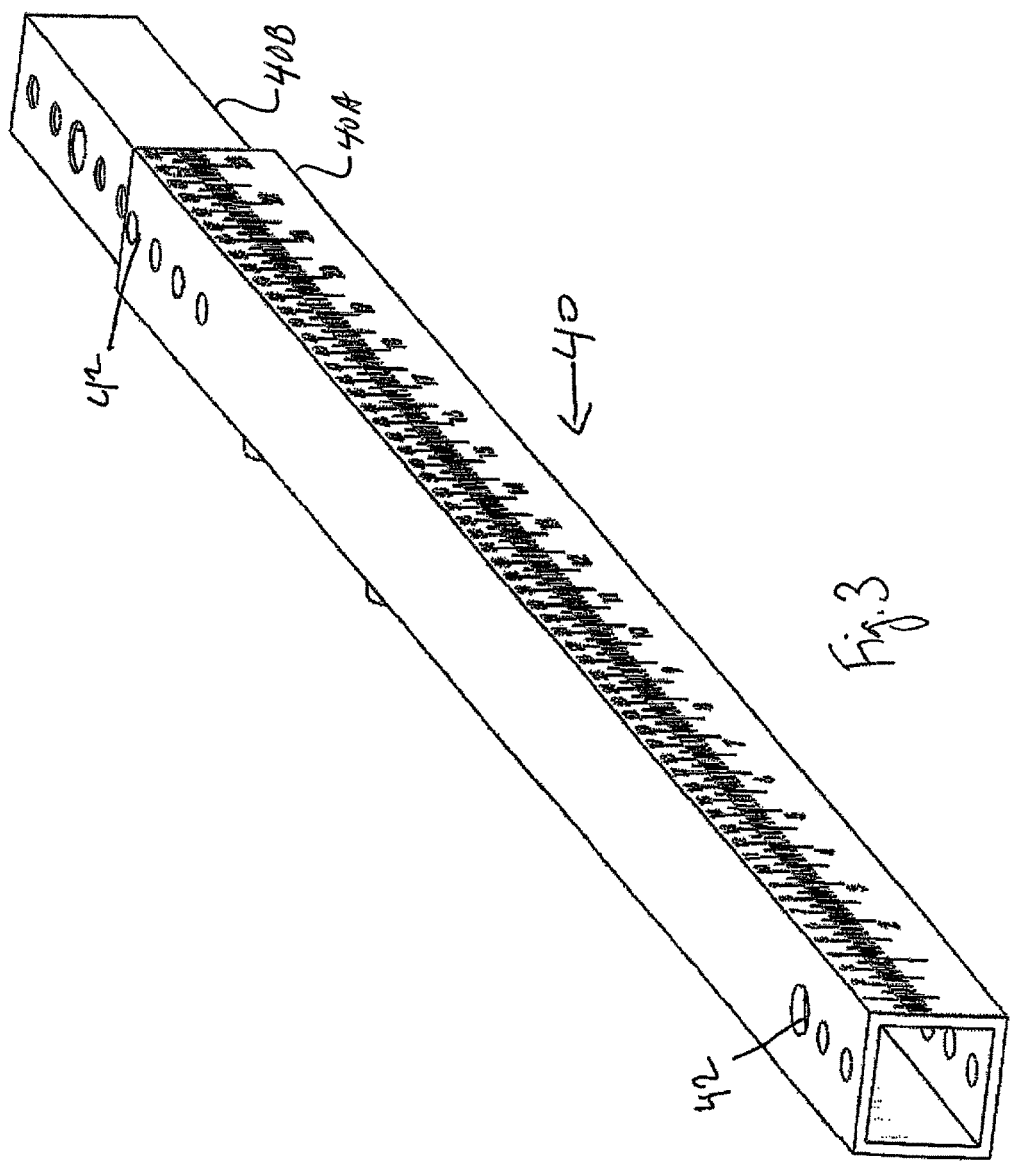
FIG. 3 illustrates an example embodiment of a middle bar forming part of an example roof assembly system and kit according to the invention.
Figure 4:
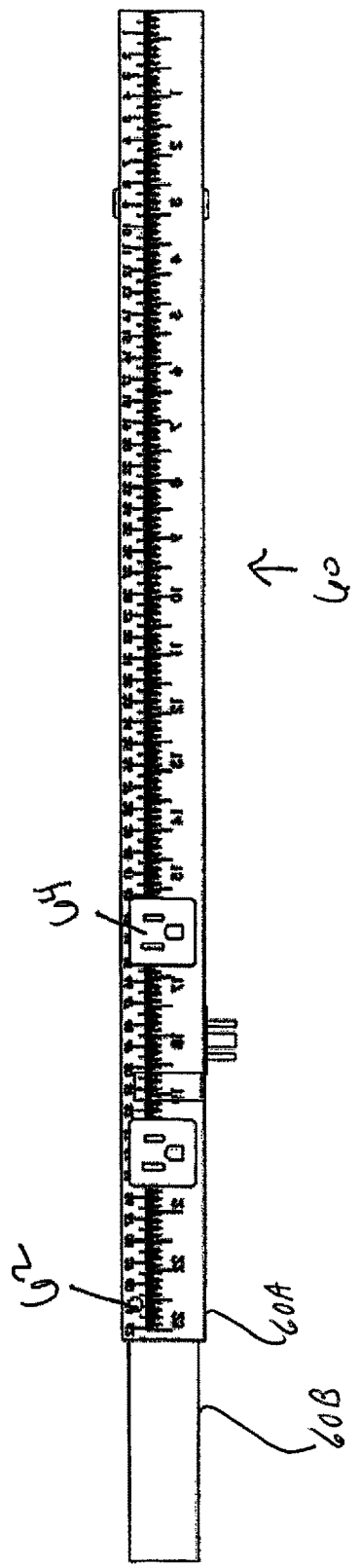
FIG. 4 illustrates an example embodiment of a power bar forming part of an example roof assembly system and kit according to the invention.

Referring now to FIGS. 3-5, there are illustrated example embodiments of bar members 40, 60 and 80 that form part of the roof assembly kit. Middle bar 40 may be hollow and includes holes 42 that allow one-way locking member 24 to be inserted there through. Middle bar 40 also includes measurement indicia, which may be inches and feet and/or millimeter and meters. Further, middle bar 40 may adjust in length depending on the size of the trusses and rafters using, for example, a two bar arrangement 40A and 40B where bar 40B slides within bar 40A to expand or contract middle bar 40 depending on the needs of the user.

FIG. 4 illustrates an example embodiment of a power bar 60 that in this example is hollow and includes a plurality of holes 62 that allow one-way locking member 24 to be inserted there through. Power bar 60 includes prongs at one or both ends to connect to a power source (as well as a power cable inside) and also includes one or more outlets 64 that provide electrical energy by acting as an extension strip or bar. Power bar 60 also includes measurement indicia, which may be inches and feet and/or millimeter and meters. Further, power bar 60 may adjust in length using, for example, a two bar arrangement 60A and 60B where bar 60B slides within bar 60A to expand or contract power bar 40, depending on the needs of the user.

FIG. 5 illustrates an example embodiment of a compressor bar 80 which includes a plurality of holes 82 that allow one-way locking member 24 to be inserted there through. Compressor bar 80 also includes air inlet value (not shown, connected to an air hose throughout the bar) and an air outlet valve 84 that supply pressurized air provided by an external compressor source. Compressor bar 80 also includes optional measurement indicia, which may be inches and feet and/or millimeter and meters and bar 80 may be adjusted in its length using, for example, a two bar arrangement 80A and 80B where bar 80B slides within bar 80A to expand or contract bar 80 depending on the needs of the user.

Referring again to FIG. 7, there is illustrated an example embodiment of compressor bar 80 connected to H-bracket 10 through window 17 and adjustment mechanism 16. In this example, one-way locking member 24 secures compressor bar 80 to H-bracket 10, which may be at the beginning or end of a roof structure. Alternatively, power bar 60 or compressor bar 80 may attach to H-bracket 10. In this example embodiment, a leveling device 18 is included that facilitates self-leveling of the H bracket and the truss or rafter on which it is located.

Figure 8:
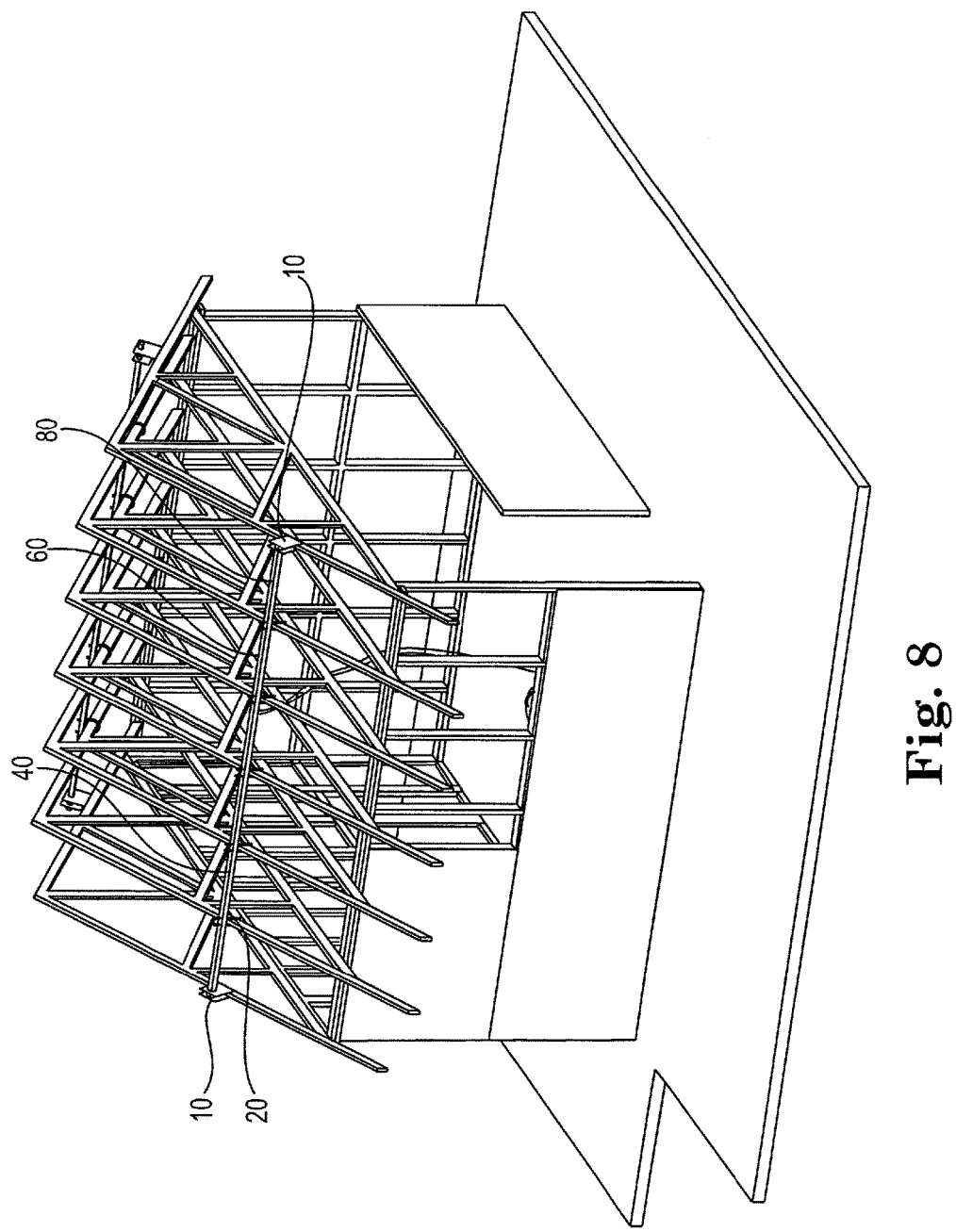
FIG. 8 illustrates an example of a complete roofing and truss assembly and system as described herein.

FIG. 8 illustrates an example embodiment of the roof erection system and kit assembly in use. H-bracket 10 attaches to each end truss and middle bar 40, power bar 60, and compressor bar 80 span the distance between the end trusses and are connected to each other with one-way locking members 24. Depending on the needs of the user, different numbers and configurations of middle bar 40, power bar 60, and compressor bar 80 may be used. In one example embodiment, the roof erection system is attached to a truss by a double headed nail (not shown). Double headed nail allows for easy removal once the trusses are erected and secured by the permanent roof sheeting.

In other related embodiments, the erection system described herein provides multiple possible functions such as wall erections for balloon framing, floor spacing, commercial rafter erection. The rigid structure of the erection system described herein provides superior strength and connectivity for which other systems lack. If a severe storm occurred during roof erection, the erection system and assembly kit described herein would make the entire structure a very secure unit.

The following patents are incorporated by reference in their entireties: U.S. Pat. Nos. 7,918,054 and 8,061,088.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. A roof erection system for stabilizing roof trusses comprising:
    an H bracket configured from two side plates that are substantially parallel to each other having a top end and a bottom end, the side plates being connected via a span or center member that is perpendicular to the side plates and is located distal to the bottom end of the side plates so as to form a bottom U-shaped end and a top U-shaped end of the H bracket, the bottom U-shaped end configured to be secured to a first truss member; and
    a bar assembly having at least a first bar and a second bar, the first bar engaged at one end with the top end U-shaped of the H bracket and a second end of the first bar engaged with the second bar in a collinear arrangement, wherein a free end of the second bar engages a second truss member with a second bracket; and
    a locking pin assembly locking the first and second bars together in the collinear arrangement.

2. The system of claim 1, wherein the locking pin assembly further comprises a security cable having a first end and a second end and a middle portion, the first end of the security cable including a locking pin and engaging the first bar with the middle portion of the security cable being wrapped around the second truss member and the second end of the cable engaging the second bar.

3. The system of claim 2, wherein the second bracket comprises a second H bracket having a bottom U-shaped end configured to engage the second truss member, wherein a free end of the bar assembly is engaged with a top U-shaped end of the second H bracket.

4. The system of claim 1, wherein the locking pin assembly is removable from the bar assembly to enable the bar assembly to be configurable to change either the first bar or the second bar that are connected in a collinear relationship.

5. The system of claim 4, wherein each bar of the bar assembly is selected from the group consisting of an electrical or power bar, an air or compression bar and a spanning bar.

6. The system of claim 3, wherein either the first or second truss member comprises a top chord and a bottom chord and wherein the bottom end U-shaped bracket is adapted to be secured to one of the top chord, bottom chord and a drop gable of either truss member.

7. The system of claim 3, wherein at least one of the H brackets includes a leveling device disposed between the side plates.

* * * * *